United States Patent Office 3,384,499
Patented May 21, 1968

3,384,499
CRYSTALLINE BONDED CERAMIC WARE PRESSING MOLD AND METHOD OF MAKING SAME
Andrew R. Blackburn, Westerville, and Virgil D. Kendall, Springfield, Ohio, assignors to The Murray Corporation of America, Pittsburgh, Pa., a corporation of Delaware
No Drawing. Filed Sept. 18, 1963, Ser. No. 309,870
12 Claims. (Cl. 106—38.9)

This invention relates generally to porous ceramic molds especially adapted for use in pressing ware from clay or similar ware forming materials. More particularly, the invention is directed to an essentially glass-free crystalline bonded ceramic to be used in ware pressing molds and method of making the same.

Plaster of Paris has been used to make porous molds to be employed in ware pressing operations. However, it is deficient for such use by reason of its lack of durability and poor tensile strength. Repeated pressings using a plaster of Paris mold tend to erode away the pressing face of the mold and break away the edges or raised portions of the mold cavity until the mold must be discarded. The low strength and brittleness of this material necessitates using reinforcing elements and expensive and bulky metal casings to keep the plaster of Paris from cracking as the ware is pressed between the mold halves. Even reinforcing and heavy mold casings are not sufficient to prevent cracking of large plaster molds for making large shapes such as a toilet tank. On the other hand, plaster of Paris possesses excellent porosity characteristics for use in ware pressing employing pressure release of the ware from the mold face as described below.

Plaster molds have found substantial use in the type of ware pressing operations in which a moist clay mass to be formed into a piece of ware is pressed between mold halves whereupon moisture from the clay enters the pores of the plaster mold. In one particular ware pressing process where the particular porosity characteristics of a plaster mold are most important, namely, the presence of many uniformly distributed small pores throughout the mold body, the pressed ware is released from the mold halves by applying a release fluid such as air through the porous mold face. This particular process is more fully described in United States Patent 2,584,109 to Blackburn and Steele.

In utilizing this process, plaster of Paris is an ideal material as far as its having the desired porosity characteristics for uniform release of the pressed ware from the mold face by applying fluid pressure internally of the mold body. The uniformly distributed fine pores permit the release fluid such as air to build up and distribute through the mold material pressure which acts fairly evenly over the surface of the pressed ware to effect its release from the mold face.

The presence of the fine pores in the mold material also assures a reasonably smooth surface for the mold face so that the pressed ware will itself have a smooth surface upon being released from the mold. Analysis indicates that these excellent porosity characteristics of plaster of Paris stem from its possessing a porosity of 40% to 45%, i.e., 40% to 45% of the volume of the material is made up of pores or voids while the remainder is solid material, with the pore size averaging about 3 microns ranging from about ½ micron to 5 microns.

A mold material ideal for use in carrying out the ware pressing process where fluid pressure release of the ware is employed should possess relatively high strength to withstand the stresses encountered in pressing the moist clay material into the ware shape as an obvious prerequisite. Also resistance to wear caused by repeated pressings with the mold is a necessity to insure any permanence and reasonable use life for the mold. As far as the porosity characteristics are concerned the material can closely approximate the porosity characteristics of plaster of Paris. Critically important characteristics for the material are uniformly distributed pores made up of small pores throughout the mold.

Having in mind the problems of obtaining a porous mold which will have the required characteristics for fluid release ware pressing it has been discovered that a mixture of alumina, ball clay and talc, in particular proportions fired short of its theoretical density will provide a new and useful mold material possessing these required characteristics particularly with respect to high strength which will withstand extended use without erosion or wearing away of the mold surface. The term theoretical density has reference to the maximum density that the material would achieve if fired to an essentially solid non-porous state.

It is therefore a principal object of the present invention to provide a composition for permanent crystalline bonded ceramic molds having alumina as its major component and containing minor amounts of ball clay and talc and which possesses high strength for long mold life and porosity characteristics appropriate for use of the molds in ware pressing operations.

It is a further object of this invention to provide a crystalline bonded ceramic for ware pressing molds comprising at least 70% alumina and minor amounts of ball clay and talc and which possesses high strength for long mold life and porosity characteristics appropriate for use of the molds in ware pressing operations.

It is a further object of this invention to provide a method of forming a porous essentially glass-free crystalline bonded ceramic mold having high strength for long life and proper porosity characteristics for ware pressing use comprising the steps of mixing a composition containing a major amount of alumina and minor amounts of ball clay and talc with an amount of liquid to render the composition formable, forming said composition into a mold of desired shape for the ware to be produced, and firing said body short of its theoretical density to produce a high strength crystalline-bonded ceramic mold having uniformly distributed small pores.

The above objects are attained according to this invention by producing an essentially glass-free ceramic mold body. This body is made from a mixture preferably containing at least 70% alumina, no more than 15% talc and up to 15% ball clay, mixed with an appropriate amount of liquid such as water to render it formable. This mixture is formed into the desired mold shape and fired short of its theoretical density, namely, the temperature and time of firing are controlled so that the body pores will not be closed up by crystals, formed incident to the firing operation. Utilizing these steps provides a strong body having a modulus of rupture of up to 15,000 p.s.i. with a porosity of at least 25% constituted by uniformly distributed fine sized pores. As an aid to the final strength of the mold, a flux of up to 5% manganese dioxide may be added to the above mixture of ingredients.

The materials can be mixed in any suitable manner such as in a blunger. However, ball mill mixing is preferred in that a superior final product is obtained in terms of increased strength and a more uniform distribution of small sized pores throughout the ceramic mold body produced from ball mill mixed materials.

The mixture may be formed into the desired mold shape for the particular ware piece to be pressed by any of several well known prior art processes. For example, the mold body may be formed by slip casting or injection molding. This latter process is described in U.S. Patent 2,669,762 to Blackburn and Steele. The mixture in the form of a slip for casting may have a specific gravity of 2.3 to 2.4 and a viscosity suitable for the type of forming to be used.

The ultimately formed composition in the mold shape is then fired at temperatures ranging from 2000° F. to 2350° F. and for a period ranging from 2 to 5 hours. The particular temperature used for any specific composition will vary depending upon the amount of alumina present and in addition, the amount of additives present. The firing conditions are limited only by the fact that the body should be fired short of its theoretical density. Firing beyond this point will result in excessive growth of crystals and a corresponding sealing of the pores, thus destroying the requisite porosity in the final body.

The effect of the firing conditions on both the strength and porosity of the final ceramic mold is most important. The strength of the ceramic material is definitely related to its porosity, i.e., as the firing progresses toward the theoretical density for the material, the strength increases while the porosity decreases due to crystal growth which progresses toward closing the pores in the material. The particular importance of high mold strength balanced against retaining the requisite porosity for the mold in the use to which it is to be put indicates that a porosity as low as 25% can be accepted under some conditions.

For example, where the nature of the moist clay mass or pressing body that is to be pressed into the ware piece by use of the mold is ideal, namely, where it releases well from the mold face under the action of fluid release pressure such as by not developing internal flaws that leave bits of the pressing body adhered to the mold face, a 25% minimum porosity can be acceptable for the mold. The higher mold strength at such a low mold porosity is of course a distinct advantage. On the other hand, some makeups of the pressing body being used with a mold can be such that smooth even release of the pressed ware will not be achieved using a mold having this low a porosity. In such case the mold porosity may well be increased to more closely approach the 40% to 45% porosity of plaster of Paris which as already noted has ideal porosity characteristics for ware pressing molds. As for the maximum permissible mold porosity it must be kept in mind that aside from the danger of getting poor uneven release action if the mold porosity is excessive the strength of the mold will be unacceptably low.

Also the maximum permissible pore size for the mold is important from the standpoint of obtaining good ware release when the mold is put into use and assuring against the production of rough surfaces on the pressed ware. Preferably, the average pore size should be no greater than 10 microns to assure best ceramic molds with good ware release. However, it can be permissible to have an average maximum pore size of 20 microns where the nature of the pressing body is such that it releases well from the mold face and smoothness of the pressed ware surface is not especially critical.

The addition of 1% to 4% of carbon black, such as lamp black, to the composition prior to mixing and firing will increase the final porosity as much as 6%. Upon firing, the carbon black is burned out of the composition. This "burn out" aids in obtaining a controlled pore size in addition to promoting uniform distribution of the pores throughout the body.

Though applicants do not wish to be limited to any particular theory of operation, it is believed that during firing, a low melting silicate liquid is formed from magnesium oxide, silicon dioxide and manganese dioxide, the magnesium oxide being derived from the talc and the silicon dixode from the same ingredients plus the clay. Manganese dioxide is present if it has been added as a flux. This melt or glass formation appears to be localized and transitory, the residual crystal phases being aluminum oxide as the primary refractory skeletal phase, and cordierite formed from decomposed clays and talc in the presence of a fluid magnesium oxide, silicon dioxide, manganese dioxide melt. Upon increasing the temperature, this melt reacts with aluminum oxide to form a fine dispersed spinel phase.

It is believed that a low melting glass is formed locally in the body and is then dried up by reaction with the primary refractory phase, aluminum oxide. Thus, the final body is essentially glass-free and contains crystal phases formed as reaction products. These phases are not those phases which the body composition would produce at equilibrium.

The following preferred specific body composition may be mentioned to exemplify a crystalline bonded ceramic particularly well suited for ware pressing molds to be employed with fluid pressure ware release. A composition containing 90% alumina, 6% ball clay and 4% talc is mixed with 5% manganese dioxide and a sufficient amount of water to form a slurry. The alumina particle size is −325 mesh while the other ingredients are of standard "air floated" grind fineness. Preferably mixing of the composition is performed in a ball mill for thorough mixing and thereby to achieve an improved final product. After mixing the slurry is cast into the desired mold shape by any conventional method such as gravity casting, or preferably, by the injection molding method such as disclosed in U.S. 2,669,762 to Blackburn and Steele. After casting, the body is fired for 5 hours at 2200° F. The final fired body possesses a porosity up to 40% with an average pore size of 10 microns and a modulus of rupture of up to 15,000 p.s.i.

The present invention has been described in detail above for purposes of illustration only and is not intended to be limited by this description or otherwise except as defined in the appended claims.

What is claimed is:

1. A porous crystalline bonded ceramic mold comprising at least 70% alumina, up to 15% ball clay and up to 15% talc fired to a point short of the theoretical density for the ceramic to provide substantially uniformly distributed porosity, said mold having characteristics appropriate for use in ware forming operations.

2. A porous crystalline bonded ceramic mold according to claim 1 wherein there is 90% alumina, 6% ball clay and 4% talc.

3. A porous crystalline bonded ceramic mold according to claim 1 wherein a flux of manganese dioxide in an amount up to 5% is added to the ingredients recited.

4. A porous crystalline bonded ceramic mold according to claim 1 wherein 1% to 4% carbon black is added to the ingredients recited.

5. A porous crystalline bonded ceramic mold according to claim 1 wherein the average pore size is no greater than 20 microns.

6. A porous crystalline bonded ceramic mold according to claim 1 wherein the average pore size is no greater than 10 microns.

7. A porous crystalline bonded ceramic mold according to claim 1 having a porosity in the range of about 25% to about 40% comprised of small sized substantially uniformly distributed pores.

8. A method of forming a porous essentially glass-free crystalline bonded ceramic mold comprising the steps of preparing a formable aqueous mixture of a composition comprising at least 70% alumina, up to 15% ball clay and up to 15% talc, forming said composition into a mold shape, and firing said mold short of the theoretical density of the composition to produce a crystalline bonded ceramic body having substantially uniformly distributed porosity, and having characteristics appropriate for use in ware pressing operations.

9. A method according to claim 8 including the steps of incorporating from 1% to 4% of a carbon black into said composition prior to forming so as to increase the porosity of the resultant body and provide a more uniform distribution of pores throughout said body.

10. A method according to claim 8 including the step of adding up to 5% manganese dioxide to said composition as a flux prior to mixing.

11. A method according to claim 8 wherein said composition is ball mill mixed to improve the strength and promote a more uniform distribution of pores throughout the body.

12. A method according to claim 8 wherein said body is fired for from 2 to 5 hours at a temperature in the range of about 2200° F. to 2350° F.

References Cited

UNITED STATES PATENTS

| 2,360,929 | 10/1944 | Blaha | 106—41 X |
| 2,631,940 | 3/1953 | Dunegan | 106—65 X |
| 2,809,898 | 10/1957 | Thiess | 106—38.9 |
| 3,238,048 | 3/1966 | Somers | 106—65 X |

FOREIGN PATENTS

| 200,903 | 7/1923 | Great Britain. |
| 396,532 | 8/1933 | Great Britain. |

ALEXANDER H. BRODMERKEL, *Primary Examiner.*

L. HAYES, *Assistant Examiner.*